United States Patent [19]

Yampolsky et al.

[11] Patent Number: 4,788,020

[45] Date of Patent: Nov. 29, 1988

[54] METHOD FOR EFFECTING MASS TRANSFER

[75] Inventors: Jack S. Yampolsky, San Diego, Calif.; Robert H. Roberts, Crosby, Tex.

[73] Assignee: General Atomics, San Diego, Calif.

[21] Appl. No.: 448,517

[22] Filed: Dec. 10, 1982

[51] Int. Cl.[4] ............................................. B01F 3/04
[52] U.S. Cl. .................................... 261/153; 261/156; 261/112.1
[58] Field of Search ................ 165/179; 261/153, 156, 261/112

[56] References Cited

U.S. PATENT DOCUMENTS

| | | | |
|---|---|---|---|
| 469,945 | 3/1992 | Johnson . | |
| 538,557 | 4/1895 | Theisen | 261/112 |
| 898,935 | 9/1908 | Sladek et al. | 261/153 |
| 921,934 | 5/1909 | Willard | 261/156 |
| 1,782,602 | 11/1930 | Brush | 261/156 |
| 1,812,339 | 6/1931 | Horne et al. . | |
| 1,910,199 | 5/1933 | Brady . | |
| 1,970,234 | 8/1934 | Huff | 261/15 |
| 2,017,643 | 10/1935 | Zucrow | 261/156 |
| 2,097,104 | 10/1937 | Saha | 257/248 |
| 2,545,028 | 3/1951 | Haldeman | 261/15 |
| 2,911,056 | 11/1959 | Edel | 261/156 |
| 3,164,644 | 1/1965 | De Ghetto et al. | 261/159 |
| 3,318,588 | 5/1967 | Russell et al. | 261/153 |
| 3,364,982 | 1/1968 | Jaffe | 165/1 |
| 3,370,635 | 2/1968 | Kumm | 165/179 |
| 3,499,734 | 3/1970 | Newman et al. | 34/384 |
| 3,761,228 | 9/1973 | Kaartinen | 23/232 R |
| 3,875,997 | 4/1975 | Newson et al. | 165/179 |
| 4,009,751 | 3/1977 | Zelnik | 165/1 |
| 4,132,264 | 1/1979 | Furlong | 165/179 |
| 4,154,296 | 5/1979 | Fijas | 165/179 |
| 4,183,897 | 1/1980 | Lanteri | 261/112 |
| 4,305,460 | 12/1981 | Yampolsky | 165/179 |
| 4,318,872 | 3/1982 | Romano | 261/140 A |

FOREIGN PATENT DOCUMENTS

| | | | |
|---|---|---|---|
| 586230 | 2/1934 | Fed. Rep. of Germany | 261/156 |
| 341783 | 6/1904 | France | 261/156 |
| 95586 | 1/1960 | Norway | 261/153 |

Primary Examiner—Tim Miles
Attorney, Agent, or Firm—Fitch, Even, Tabin & Flannery

[57] ABSTRACT

Apparatus for effecting mass transfer between liquid and gas phases includes a chamber having a tube bundle therein comprised of a plurality of spiral fluted tubes maintained in upstanding relation by transverse tube sheets. Relatively short tubular inserts cooperate with the opposite ends of the spiral fluted tubes in a manner to facilitate passage of liquid downwardly through each tube in the form of a liquid film on the interior spirally fluted tube surfaces, and enable passage of gas upwardly through each tube such that the gas directly contacts the liquid film and effects mass transfer therebetween. Inlet and outlet coolant passages enable coolant to be introduced into the chamber for removing heat of absorption from the external surfaces of the tubes.

1 Claim, 1 Drawing Sheet

METHOD FOR EFFECTING MASS TRANSFER

BACKGROUND OF THE INVENTION

The present invention relates generally to apparatus and processes for effecting mass transfer between a liquid and a gas, and more particularly to a novel method and apparatus for effecting mass transfer between a liquid and a gas at substantially higher flow rates than have heretofore been obtainable.

Apparatus and techniques for effecting mass transfer in processes such as absorbtion, desorbtion, distillation and stripping are generally known. Many of the known apparatus are of the falling-film type in which a liquid flowing down the inside surface of a generally vertical cylindrical tube in a thin film absorbs a gas which is caused to flow internally of the tube in contacting relation with the liquid film. See, for example, U.S. Pat. No. 3,318,588.

It is recognized that mass transfer in processes such as absorbtion, desorbtion, distillation and stripping may be enhanced by increasing the velocity and hence the Reynolds number of gas flowing countercurrent to the falling liquid film with which the mass exchange is taking place. This is particularly pertinent where the exchange process between the liquid and gas is limited by the resistance on the gas side of the interface as the exchange within the gas increases with the Reynolds number of the gas flow. Further, since the rate of mass transfer is temperature dependent and may be either exothermic or endothermic, the ability to transfer heat simultaneously with the mass transfer to achieve temperature control is highly desirable.

Attempts have been made to increase the velocity of the flowing gas relative to the liquid film in the known mass transfer apparatus of the falling-film For example, in the aforementioned U.S. Pat. No. 3,318,588, tubular gas velocity increasers are concentrically arranged within the upper ends of heat exchange tubes in a manner to form an annulus for the passage of the falling liquid film and flowing gas so as to increase the gas mass velocity. A limitation in mass transfer processes which employ the falling-film principle is the stability of the falling liquid film in the presence of the counterflowing gas. As the gas flow increases for a particular liquid flow rate, waves appear on the liquid surface and the liquid film becomes more unstable with further increase in gas velocity so as to result in the phenomenon of flooding. At the flooding condition, the flow becomes chaotic, the liquid film breaks up and the liquid becomes entrained in the gas flow. In the case of gas flowing upwardly within the falling-film tubes, some of the liquid entrained in the gas flow is expelled from the top of the tube.

It therefore follows that delaying the onset of flooding will enable higher gas velocities and, accordingly, a greater turbulent exchange within the gas and at the liquid-gas interface. One attempt at obtaining more intensive transfer between contacting phases is disclosed in U.S. Pat. No. 4,009,751 wherein apparatus in the form of a smooth cylindrical tube has a helical insert on the internal wall of the tube to guide the liquid phase flow in a helical path down the internal wall surface of the tube, and has a second helical insert in the form of a twisted tape disposed generally axially of the tube to establish a rotational flow of the lighter phase gas in a rotational direction opposite to the rotational flow imparted to the liquid phase. Spiral flow of the liquid phase in a falling-film type heat exchanger is also taught by U.S. Pat. No. 2,545,028 in which a falling liquid film is introduced through an annulus at the upper end of a cylindrical flow passage while undergoing substantially tangential flow.

SUMMARY OF THE INVENTION

One of the primary objects of the present invention is to provide a novel method and apparatus for effecting mass transfer between liquid and gas phases and which provides substantial improvement in mass transfer over the prior apparatus and techniques.

A more particular object of the present invention is to provide a novel method and apparatus for effecting mass transfer between liquid and gas phases and which is adapted to employ substantially higher gas velocities and thereby obtain greater turbulent exchange within the gas and at the liquid-gas interface than has heretofore been obtainable.

In accordance with the invention, mass transfer is effected by introducing a liquid into one or more upstanding spiral fluted tubes in a manner to establish a downwardly flowing liquid film on the internal spirally fluted wall surface of each tube. The curvature of the internal spiral flute surfaces and the surface tension of the liquid combine to enable a very thin liquid film to pass spirally downwardly through each tube and be retained against the inner spiral flute surfaces by centrifugal force. In this manner, a countercurrent gas may be caused to flow upwardly within each of the tubes at a substantially greater velocity without causing flooding to occur than has heretofore been obtainable with smooth cylindrical wall tubes. The ability of the spirally fluted tubes to retain a liquid film on the inner spiral fluted surfaces in the presence of a counterflowing gas internally of the tube enables improved heat transfer on the outside wall of the tube. When employed to remove small size particulate material from a gas, the turbulent motion imparted to a countercurrent gas flow within the spirally fluted tubes causes the particulate matter to be transported to the wetted wall such that the particles will be retained in the liquid film by surface tension forces and removed from the gas.

Further objects and advantages of the invention, together with the organization and manner of operation thereof, will become apparent from the following detailed description of the invention when taken in conjunction with the accompanying drawing wherein like reference numerals designate like elements throughout the several views.

DETAILED DESCRIPTION OF PREFERRED EMBODIMENT

Figure 1:
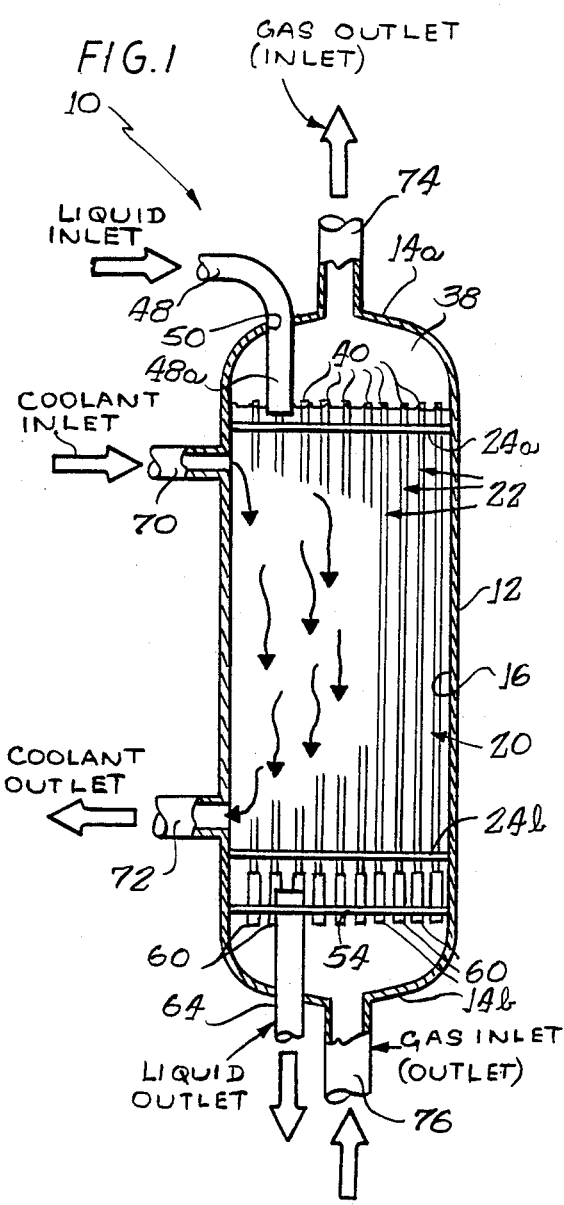
FIG. 1 is a longitudinal sectional view of an apparatus for effecting mass transfer absorption in accordance with the present invention.

Referring now to the drawing, and in particular to FIG. 1, the present invention is illustrated, by way of example, in apparatus 10 for effecting mass transfer between a liquid and a gas. The apparatus 10 may, for example, be employed in an ammonia absorption process in which ammonia gas is absorbed by a weak ammonia-liquid so as to effect a maximum saturation of the weak liquid. The apparatus 10 includes housing or pressure vessel means in the form of a generally cylindrical housing or casing 12 having upper and lower dome shaped ends 14a and 14b, respectively, and defining an internal substantially cylindrical chamber 16 the longitudinal axis of which defines the longitudinal axis of the pressure vessel.

A tube bundle, indicated generally at 20, is supported within the internal chamber 16 and includes a plurality of substantially identical elongated tubes 22 which are maintained in generally uniform spaced relation parallel to the longitudinal axis of the pressure vessel 12 by upper and lower transverse tube sheets 24a and 24b. The tube sheets 24a,b have their outer peripheral edges secured to the inner surface of the housing or pressure vessel 12 as by welding or the like.

Figure 2:
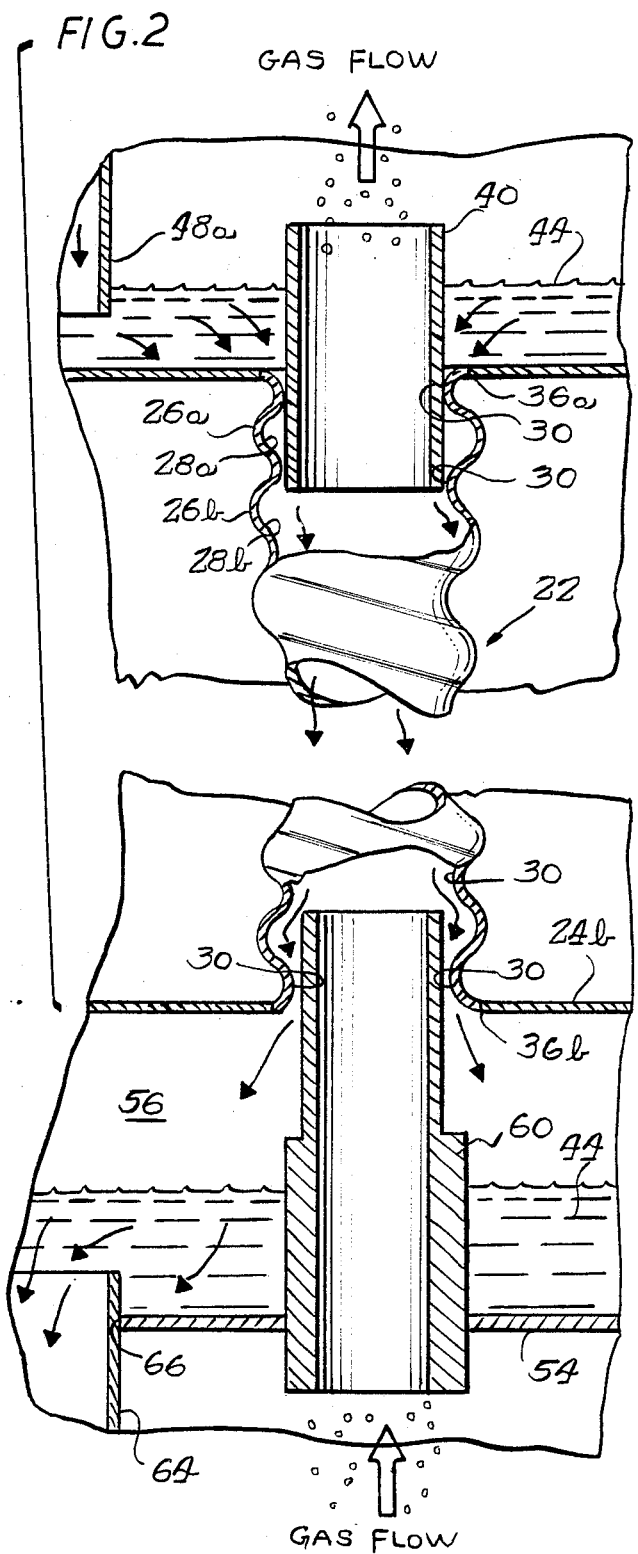
FIG. 2 is a fragmentary foreshortened view, on an enlarged scale, of a spirally fluted tube as employed in the apparatus of FIG. 1.

With particular reference to FIG. 2, and in accordance with the present invention, each of the tubes 22 comprises a spiral fluted tube having multiple start continuous helical or spiral flutes two of which are indicated at 26a and 26b. Each of the plurality of spiral flutes 26a,b, etc., has an internal spiral flute surface, such as indicated at 28a and 28b, respectively, defining a corresponding helical or spiral flute path. The multiple start flutes are contiguous such that adjacent flutes define a generally sine wave profile, as considered in a longitudinal cross section of the tube as shown in FIG. 2, with the sine wave profile defining the valley flute surfaces 28a,b separated by internal spiral crest surfaces 30.

Each tube 22 is made of a suitable metallic material of substantially uniform thickness and, in the preferred embodiment, is formed to a configuration as disclosed in U.S. Pat. No. 4,305,460, which is incorporated herein by reference. Briefly, the metallic tubes 22 may be made of any suitable metallic heat transfer material, examples of which include 12 percent chrome allo steel such as Type 420 or 422 stainless steel, or Type 300 series stainless steel, titanium and aluminum. The spiral fluted tubes 20 may be formed from metallic strip material having a thickness of approximately 0.015 to 0.120 inch and which is preformed with longitudinal flutes therealong enabling subsequent forming into a spiral fluted tube having a butt welded seam and a diameter of approximately ¾ to 1 inch. The tubes 20 may be formed such that the flutes define a spiral or helix flute angle in the range of between approximately 25° and 50°, the spiral or helix angle being defined as the included angle between the longitudinal axis of the corresponding tube and a plane tangent to the butt welded seam and normal to the axis of the tube. The exact value of the spiral flute angle is dependent on the value of thermal flux.

The height of the multiple start flutes 26a,b, etc. relative to the hydraulic diameter of the tube 22 should be greater than the relative thickness of the laminar sublayer at a Reynolds number of 30,000, where hydraulic diameter is defined as the product of four times the cross sectional flow area divided by the wetted perimeter. The cross sectional area is taken in a plane transverse to the longitudinal axis of the tube, while the wetted perimeter is the full periphery of the inside surface of the tube in the transverse plane at which the cross sectional area is taken. The flute height is defined as the difference between the radius of a right cylinder tangent to the internal crest surfaces 30 and a right cylinder tangent to the maximum internal valley surfaces 28a,b. The ratio of flute height to hydraulic diameter should be greater than 0.025 and preferably in the range of approximately 0.050 to 0.250. The number of flutes for a given tube is dependent upon the flute helix or spiral angle and the hydraulic diameter, and preferably is selected from the range of approximately 20-40, the lower number of flutes being selected for tubes having a flute helix or spiral angle in the upper end of the aforementioned range 25°-50°, while a greater number of flutes is selected for a flute helix or spiral angle in the lower end of the range 25°-50°. A more detailed description of the preferred geometry for the tubes 22 is set forth in the aforementioned U.S. Pat. No. 4,305,460.

The upper and lower tube sheets 24a and 24b have a plurality of generally equidistantly spaced openings therethrough, such as indicated at 36a and 36b, respectively, in FIG. 2, which are axially aligned in pairs and sized to enable securing of the upper and lower ends of the spirally fluted tubes 22 in sealed relation to the tube sheets as by welding or the like. The openings 36a,b in the tube sheets 24a,b are suitably configured to conform to the outer peripheral surface configuration of the spirally fluted tube and form a full peripheral seal about the tube. In this manner, the upper tube sheet 24a forms an upper liquid reservoir 38 above the upper tube sheet which has flow communication with each of the spirally fluted tubes 22.

Each of the spirally fluted tubes 22 has a cylindrical tube or insert sleeve 40 extending downwardly within its upper end in tight fitting relation with its internal crest surfaces 30 so as to be supported in substantially fixed relation within the corresponding fluted tube. The insert sleeves 40 extend downwardly a predetermined distance within their associated spiral tubes 22 and define gas outlet or inlet tubes which facilitate passage of gas through the corresponding spirally fluted tubes. The tubes 40 extend upwardly from the upper transverse tube sheet 24a so as to provide a means for the collection of liquid, such as liquid ammonia indicated at 44 in FIG. 2, introduced into the reservoir 38 through an inlet conduit 48 received through a suitable opening 50 in the upper dome shaped end 14a of the pressure vessel, the conduit 48 having a discharge end 48a which extends below the upper ends of the tubes 40 as illustrated. The tubular inserts 40 facilitate entry of liquid into the spirally fluted tubes through the flute channel starts formed between the outer cylindrical surfaces of the tubular inserts and the internal perimeters of the spirally fluted tubes.

The liquid flow rate into the spirally fluted tubes 22 is determined by the length of projection of the inserts 40 into the fluted tubes, the liquid level maintained above the tube sheet 24a, and the cross-sectional area of liquid entry fluted channels If it is desired to minimize the available flow area within the spiral flute passages 28a,b, etc., so as to reduce the flow rate therethrough, the crest surfaces 30 may be formed flat, as by machining, so as to enable insertion of a larger diameter insert tube 40 with a corresponding reduction in the flute passage area circumferentially of the insert tube.

A third transverse tube sheet 54 is disposed within the cylindrical chamber 16 and has its outer peripheral surface secured to the wall of the pressure vessel in sealed relation therewith as by welding or the like. The tube sheet 54 defines with the tube sheet 24b a liquid reservoir 56 to receive liquid passing downwardly through the spiral fluted tubes 22. The transverse tube sheet 54 supports a plurality of substantially identical cylindrical tubular inserts 60 each of which extends upwardly within the lower end of a corresponding spirally fluted tube 22. The outer diameters of the tubular inserts 60 are selected such that their outer peripheral surfaces are spaced radially inwardly a predetermined distance from the crest surfaces 30 on the corresponding spiral fluted tubes. The tubular inserts 60 serve as gas flow passages and, with the associated upper tubular inserts 40, enable passage of a gas, such as ammonia gas, upwardly through the corresponding spirally fluted tubes 22 in countercurrent flow to the downwardly descending liquid, such as liquid ammonia, in which it is desired to absorb the ammonia gas. The gas may be passed downwardly through the tubes 22 and associated inserts 40 and 60 if desired. A liquid discharge conduit 64 extends upwardly through a suitable opening in the lower dome shaped end 14b of the pressure vessel 12 and passes through a suitable circular opening 66 in the lower tube sheet 54 in sealed relation therein so as to receive the liquid 44 accumulated within the reservoir 56 from the spirally fluted tubes 22 and facilitate passage of the ammonia enhanced liquid to an external reservoir or device (not shown).

To facilitate removal of the heat of absorption from the spirally fluted tubes 22 during operation of the apparatus 10, a coolant inlet nozzle or conduit 70 and a coolant outlet nozzle or conduit 72 are mounted on the pressure vessel housing or casing 12 as illustrated in FIG. 1 to enable coolant to be passed through the internal chamber 16 about the outer surfaces of the spirally fluted tubes 12 whereafter the coolant is removed through the coolant outlet 72. An upstanding tubular gas outlet or inlet duct 74 and a tubular gas inlet or outlet duct 76 are fixed to the upper and lower dome shaped ends 14a and 14b of the pressure vessel, preferably in axial alignment with the longitudinal axis of the pressure vessel, to enable gas to be passed through and removed from the spirally fluted tubes 22. It is understood that the gas outlet and inlet tubes 74 and 76 may alternatively serve as inlet and outlet tubes or ducts depending on the direction in which the gas is passed through the spirally fluted tubes.

In the operation of the apparatus 10, a liquid such as liquid ammonia is introduced into the inlet conduit 48 while a suitable gas, such as ammonia gas, is preferably caused to flow upwardly through the lower tubular inserts 60. The liquid enters the spirally fluted tubes 22 peripherally of the associated inlet tubes 40 through the fluted flow passages so as to form a thin film which passes downwardly within the spiral flutes 28a,b, etc. and is maintained against the inner flute surfaces due to the gravitational force acting on the liquid. While the surface tension of the liquid will generally cause a thicker film to be formed on the flute valley surfaces 28a,b and a thinner film to be formed on the flute crests 30, the liquid flow will be generally similar to that of a thin uniform film on an inclined plane with the angle of inclination substantially equal to the helix or spiral angle of the spiral flutes.

As the liquid traverses the helical paths downwardly within the spirally fluted tubes, a centrifugal force is developed in the direction of the tube wall tending to further hold the liquid against the wall surface resisting destabilization. Since the stability of thin liquid films is enhanced with decreasing angles of inclination, the stability of the thin liquid films internally of the spiral tubes is considerably enhanced over liquid film flow on smooth internal cylindrical tube surfaces. This enables a substantially greater gas flow upwardly through the spirally fluted tubes in countercurrent relation to the downwardly descending liquid before flooding occurs then can be obtained with smooth wall cylindrical tubes.

The spiral flutes in the spirally fluted tubes 22 cause rotation of both the liquid and gaseous streams which represent the heavier and lighter phases. While the sense of the bulk of rotation of both phases is the same, there is a counter rotation of the gas within the flutes 28a,b etc. such that a secondary flow is established which causes the bulk gas flow upwardly through the tubes to rotate. With spirally fluted tubes formed in accordance with the teaching of U.S. Pat. No. 4,305,460, gas velocities of up to approximately 80 ft./sec. may be employed without flooding in spirally fluted tubes having outer diameters of approximately ¾ to 1 inch.

In accordance with the apparatus 10, a gas may be caused to flow upwardly through the fluted tubes 22 which contains particulate matter of extremely small size. In conventional cylindrical tubes, the particles are generally quite difficult to remove from the gas stream due to the small size particles following the turbulent motion of the gas. When such particulate carrying gas is passed upwardly through the spirally fluted tubes 22 in which a liquid is passed downwardly within the spiral flutes in the form of a thin film establishing a wetted wall within the corresponding tube, the particulate matter will be transported to the wetted wall by the turbulence in the gas stream abetted by the centrifugal field imposed by the flutes. When contacted by the liquid film on the internal wall surface of the spirally fluted tube, the particulate matter will be captured in the liquid by surface tension forces and removed from the gas. The amount of particulate matter removed from a particular gas depends upon the length of the tube and the Reynolds number of the gas flow.

Thus, in accordance with the present invention, an apparatus and method for enhancing mass transfer are provided which employ spirally fluted tubes having a predetermined flute geometry to achieve the desired rotation and liquid stability and prevent flooding at relatively high rates of gas flow. Delay of the onset of flooding enables higher gas velocities and hence greater turbulent exchange within the gas and at the liquid-gas interface between the gas and the liquid, thereby providing greater heat transfer to the external surfaces of the spirally fluted tubes. This feature provides a significant heat transfer advantage over prior mass transfer apparatus.

While a preferred embodiment of the present invention has been illustrated and described, it will be understood that changes and modifications may be made therein without departing from the invention in its broader aspects. Various features of the invention are defined in the following claim.

What is claimed is:

1. A method for effecting mass transfer between a liquid and a gas capable of mass transfer therebetween by increasing the velocity of gas flow consequently the Reynolds number of the gas before the phenomena of flooding occurs, forming a reservoir of liquid above a plurality of spirally fluted tubes each having a substantially vertical axis, providing twenty to forth flutes inclined at angle of between 25° to 50° relative to the tube axis in each of said spirally fluted tubes, introducing liquid from said reservoir into twenty to forty fluted channel starts formed at the upper ends of the spirally fluted tubes, said channel starts being defined by crests on the spirally fluted tubes abutting at spaced locations the cylindrical surface of a downwardly projecting hollow member, flowing the liquid in said channel starts along the inner flute valley surfaces to begin a spiral flow and flowing the liquid to a location below the lower ends of said hollow members with a thicker film of liquid on the fluted valley surfaces than the liquid film on the crests, and passing a gas at a velocity of up to about 80 feet per second without flooding through said hollow members and said spirally fluted tubes in contacting relation with said liquid film so as to effect mass transfer therebetween without flooding, said liquid film flowing downwardly continually at an angle of inclination substantially equal to the helical angle for said fluted surfaces and; flowing the gas into the spiral flutes of the tubes and establishing therein secondary rotation of the gas in the flutes in a counter direction to the direction of liquid rotation to cause a bulk rotation of the upwardly flowing gas.

* * * * *

UNITED STATES PATENT AND TRADEMARK OFFICE
CERTIFICATE OF CORRECTION

PATENT NO. : 4,788,020
DATED : November 29, 1988
INVENTOR(S) : Jack S. Yampolsky and Robert H. Roberts It is certified that error appears in the above-identified patent and that said Letters Patent is hereby corrected as shown below:

Column 1, Line 36, after "falling-film" insert --type.--;

Column 1, Line 37, after "type." should not begin a new paragraph.

Column 3, Line 38, change "allo" to --alloy--;

Column 3, Line 59, change "cross sectional" to --cross-sectional--;

Column 3, Line 60, change "cross sectional" to --cross-sectional--;

Column 3, Line 64, change "cross sectional" to --cross-sectional;

Column 4, Line 53, after "channels" insert --.-- (period);

Column 6, Line 10, after "28a,b" insert --,-- (comma);

Column 6, Line 66, change "forth" to --forty--.

Signed and Sealed this

Sixth Day of June, 1989

Attest:

DONALD J. QUIGG

Attesting Officer

Commissioner of Patents and Trademarks